(12) United States Patent
Caliskan et al.

(10) Patent No.: US 7,441,830 B2
(45) Date of Patent: Oct. 28, 2008

(54) DUAL TUBE LOWER FRAME MIDRAIL STRUCTURE

(75) Inventors: Ari Caliskan, Canton, MI (US); Dean Gericke, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 11/147,960

(22) Filed: Jun. 8, 2005

(65) Prior Publication Data

US 2007/0138838 A1 Jun. 21, 2007

(51) Int. Cl.
*B62D 25/20* (2006.01)
*B62D 21/00* (2006.01)

(52) U.S. Cl. .................. 296/204; 296/205; 296/203.04; 280/798; 280/788

(58) Field of Classification Search .................. 296/205, 296/204, 203.04; 280/797, 798, 788
See application file for complete search history.

(56) References Cited

U.S. PATENT DOCUMENTS

| | | | | |
|---|---|---|---|---|
| 4,708,391 A | | 11/1987 | Nakano | 296/204 |
| 4,986,597 A | * | 1/1991 | Clausen | 296/205 |
| 5,201,566 A | * | 4/1993 | Mori | 296/192 |
| 5,213,386 A | * | 5/1993 | Janotik et al. | 296/29 |
| 5,338,080 A | * | 8/1994 | Janotik et al. | 296/29 |
| 5,411,311 A | | 5/1995 | Shimmell | 296/194 |
| 5,839,776 A | * | 11/1998 | Clausen et al. | 296/187.03 |
| 5,988,734 A | | 11/1999 | Longo | 296/203.01 |
| 6,773,057 B2 | | 8/2004 | Nomura | 296/198 |
| 7,066,533 B2 | * | 6/2006 | Sohmshetty et al. | 296/203.02 |
| 2004/0080188 A1 | | 4/2004 | Igarashi | 296/203.04 |
| 2005/0236827 A1 | * | 10/2005 | Mouch et al. | 280/788 |

\* cited by examiner

*Primary Examiner*—Dennis H Pedder
(74) *Attorney, Agent, or Firm*—Frederick Owens; Miller Law Group, PLLC

(57) ABSTRACT

A lower frame midrail structure for an automotive vehicle is formed from a pair of tubular members manufactured through a hydroforming process. The two tubular members are welded together in a longitudinally extending portion to provide support for the mounting structure of a bumper assembly. The joinder of the two tubular members creates a lower frame midrail cross-section that has a generally vertical internal web to strengthen and stiffen the midrail structure. The two tubular members laterally diverge from one another in a divergent zone in which the laterally spaced tubular members provide a stable interior and exterior support for a shock tower support member to be welded to the top of the tubular members. The hydroforming process can form openings in the sidewalls of the tubular members to permit passage of cross frame members to enhance the welding of the cross frame members to the midrail structure.

18 Claims, 4 Drawing Sheets

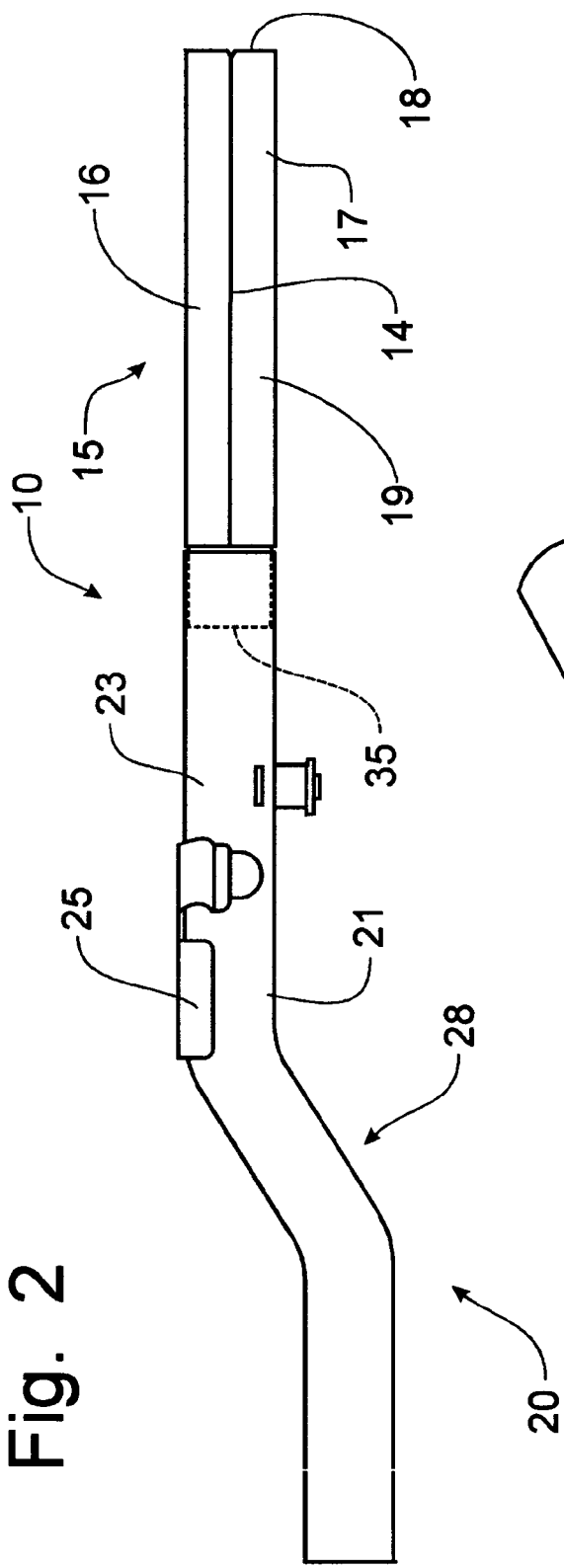

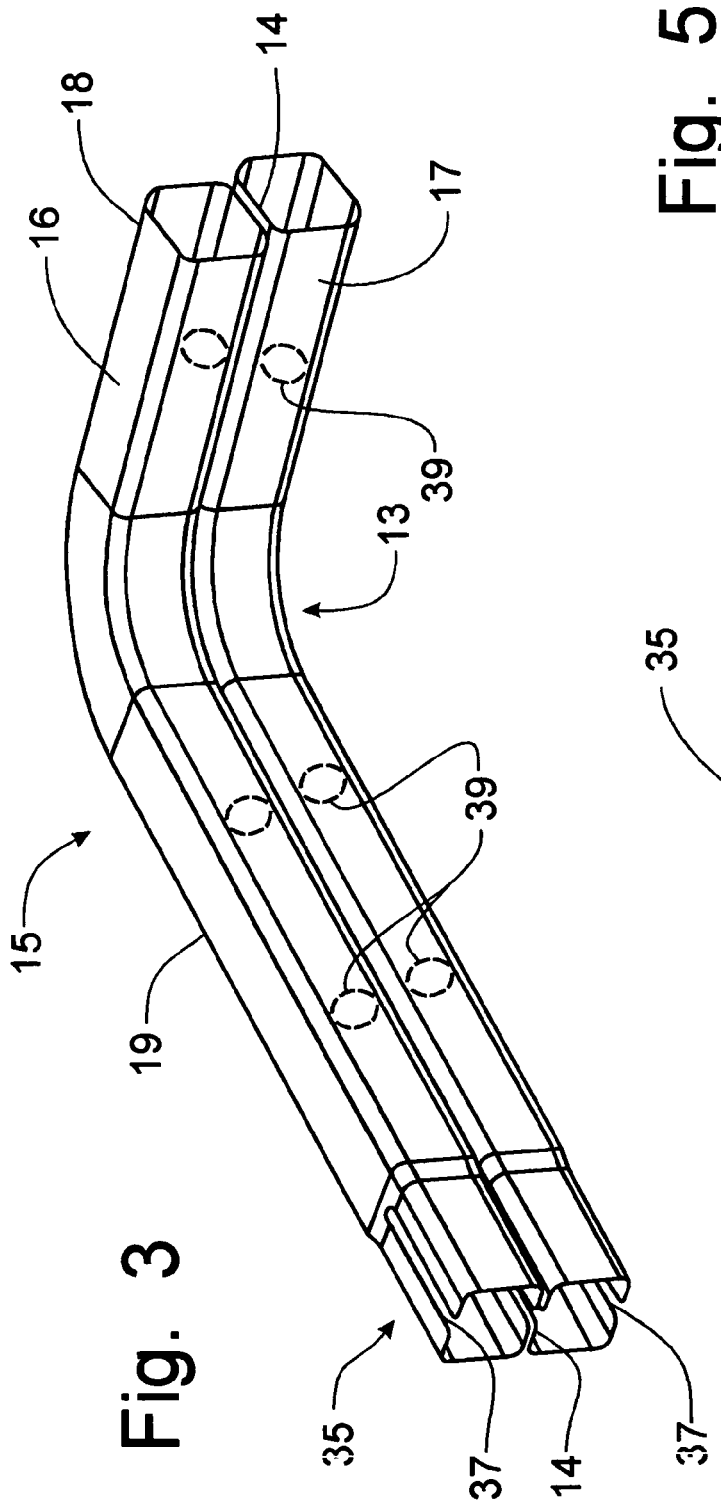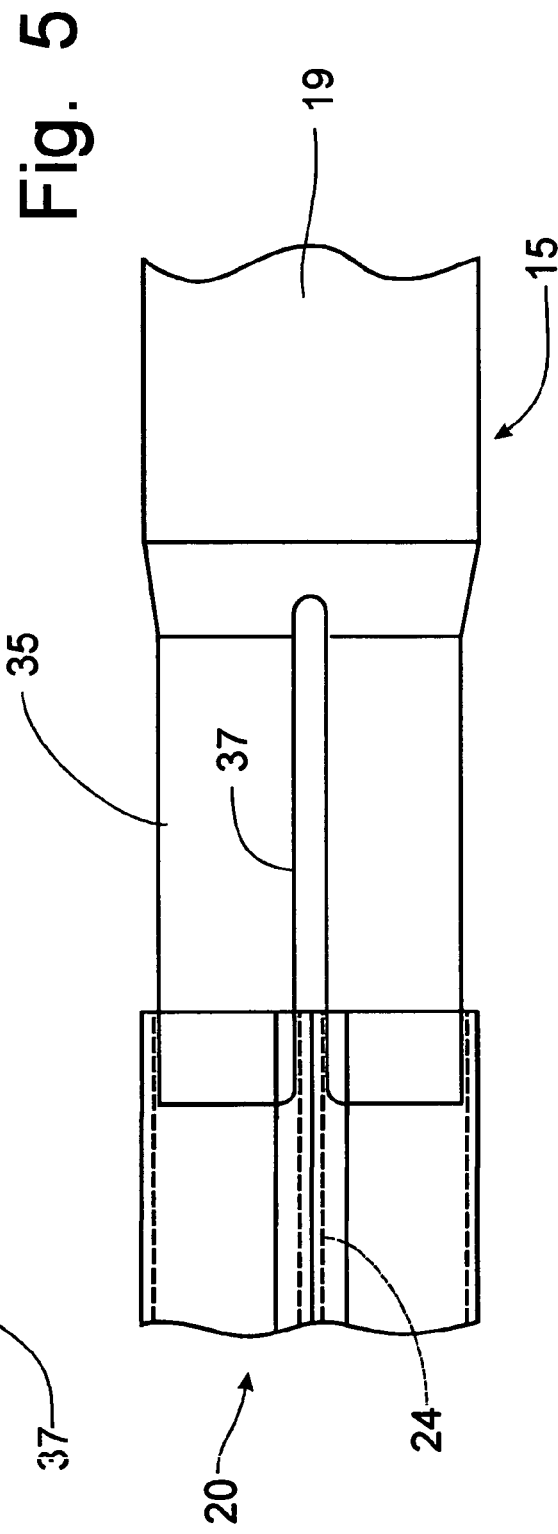

DUAL TUBE LOWER FRAME MIDRAIL STRUCTURE

FIELD OF THE INVENTION

This invention relates to a lower frame midrails for an automotive vehicle and, more particularly, to a midrail assembly formed from a pair of side-by-side tubular members, which provide an enhanced support for the shock tower support member.

BACKGROUND OF THE INVENTION

Lower frame midrails in an automotive vehicle support the central part of an automotive chassis and provide a cantilevered support for the rear bumper assembly. Conventionally, the rear bumper assembly would include a transverse bumper beam, lower frame rails and appropriate attachment brackets for connecting the bumper beam to the lower frame rails and the lower frame rails to the midrails. The rear shock tower support members are mounted on top of the midrails, conventionally in a cantilevered manner off of a single fabricated rail structure.

The structure of a lower frame midrail can vary significantly from manufacturer to manufacturer. As can be seen in U.S. Patent Publication No. 2004/0080188, filed by Masanori Igarashi, et al and published on Apr. 29, 2004, the longitudinal frame rails are connected by a cross frame member with legs that straddle the shock absorber column. A bracket is placed over the leg to mount and support the shock absorber. In U.S. Pat. No. 4,708,391, issued to Mitusou Nakano on Nov. 24, 1987, the longitudinal frame rails are reinforced by a member that is located adjacent both longitudinal sides of the shock absorber spring.

U.S. Pat. No. 5,411,311, issued to Roger Shimmell, et al on May 2, 1995, and assigned to Ford Motor Company, the front shock absorber towers are braced with a transverse member between the towers and members located between the cowl and the shock absorber towers. U.S. Pat. No. 5,988,734, issued to Stephen Longo, et al on Nov. 23, 1999, teaches a conventional bumper mounting configuration wherein the vehicle frame is reinforced by a central tunnel and reinforcing pads between the tunnel and the rails. Akira Nomura, in U.S. Pat. No. 6,773,057, issued on Aug. 10, 2004, teaches that the front shock strut tower can be supported on an apron, which is reinforced by members that extend between the longitudinally extending tubular members.

It would be desirable to provide lower frame midrails for use in conjunction with a bumper and lower frame rail structure of an automobile that are particularly adaptable to manufacturing through hydroforming processes and which can be utilized to provide a stable support for the rear shock tower.

SUMMARY OF THE INVENTION

It is an object of this invention to overcome the aforementioned disadvantages of the known prior art by providing a lower frame midrail structure that is formed from a pair of tubular members.

It is a feature of this invention that the lower frame midrail structure can be formed through hydroforming processes to enhance manufacturing efficiencies.

It is an advantage of this invention that the geometrical configuration of the lower frame midrails can be sized to correspond to a bumper beam that integrally incorporates the bumper beam and lower frame mounting rails.

It is still another advantage of this invention that the two tubular members of the lower frame midrails can be welded together at a longitudinally extend portion for mounting with the bumper support structure.

It is still another feature of this invention that the lower frame midrails can be separated in a divergent portion to provide interior and exterior support for a shock tower support member.

It is a further advantage of this invention that the shock tower support stamping can have support on laterally spaced frame members to provide a stable support for the rear shock tower.

It is another object of this invention to provide a dual tube lower frame midrail structure that is durable in construction, inexpensive of manufacture, facile in assemblage, and simple and effective in use.

These and other objects, features and advantages are accomplished according to the instant invention by providing a lower frame midrail structure for an automotive vehicle that is formed from a pair of tubular members manufactured through a hydroforming process. The two tubular members are welded together in a longitudinally extending portion to provide support for the mounting structure of a bumper assembly. The joinder of the two tubular members creates a lower frame midrail cross-section that has a generally vertical internal web to strengthen and stiffen the midrail structure. The two tubular members laterally diverge from one another in a divergent zone in which the laterally spaced tubular members provide a stable interior and exterior support for a shock tower support member to be welded to the top of the tubular members. The hydroforming process can form openings in the sidewalls of the tubular members to permit passage of cross frame members to enhance the welding of the cross frame members to the midrail structure.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a side elevational view of the bumper and lower frame rail structure depicted in FIG. 1;

FIG. 3 is an enlarged partial perspective view of the bumper structure incorporating the principles of the instant invention;

FIG. 4 is an enlarged perspective detail view of the reduced terminal end portion of the longitudinally extending mounting legs of the bumper structure to be inserted into the lower frame rails, as is depicted in FIGS. 1 and 2;

FIG. 5 is a top plan view of the reduced terminal end portion of the mounting leg structure being inserted into the dual tube lower frame rails as depicted in FIGS. 1 and 2;

DETAILED DESCRIPTION OF THE PREFERRED EMBODIMENT

Figure 1:
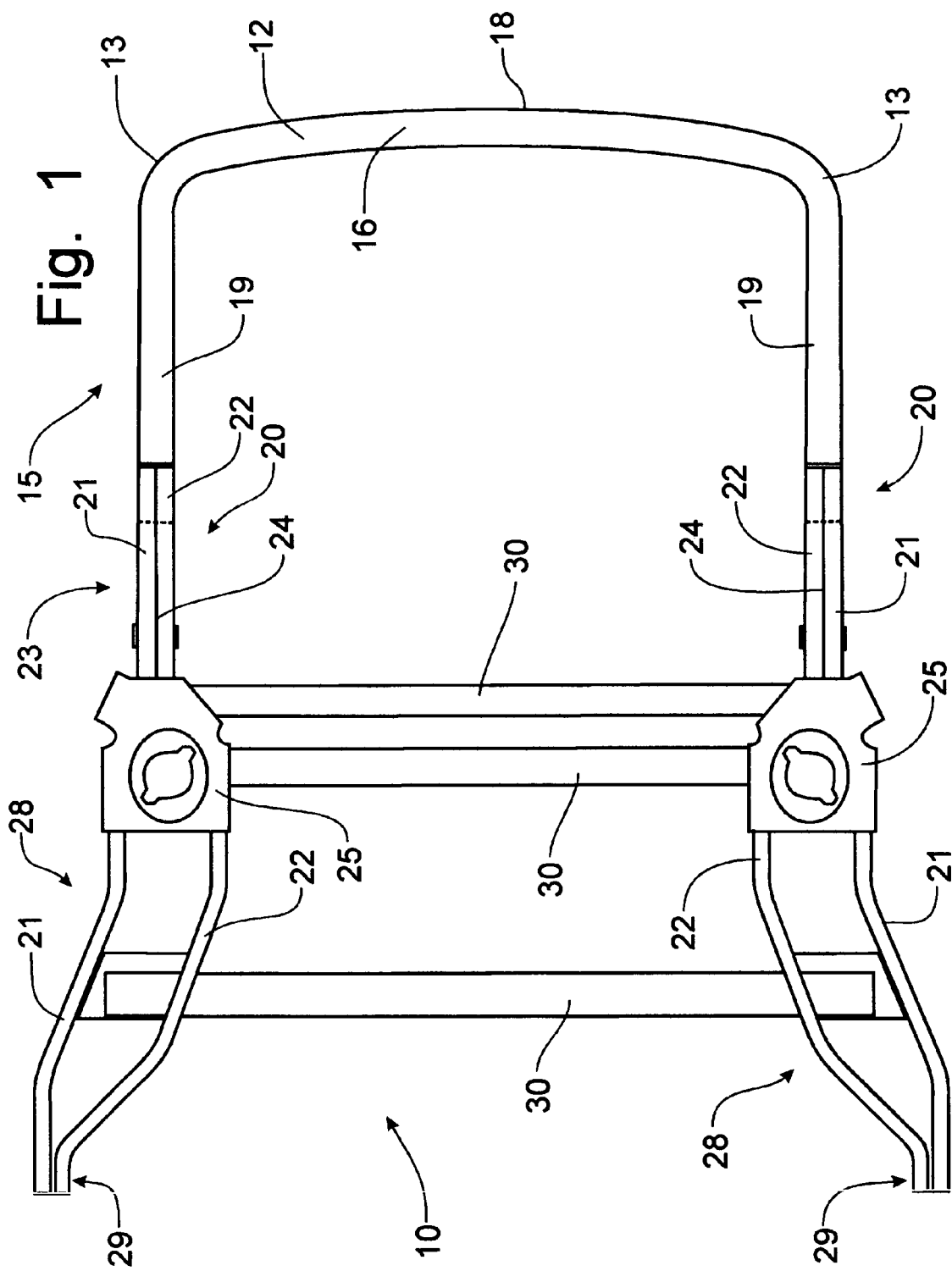
FIG. 1 is a top plan view of the single component bumper and lower frame rail structure to form the rear frame structure for an automobile incorporating the principles of the instant invention.

Referring to FIGS. 1 and 2, a bumper and lower frame rail, including a shock tower support, forming a part of the rear end of an automobile frame and incorporating the principles of the instant invention, can best be seen. The frame 10 of the automobile is preferably formed from hydroformed tubular members. Such tubular members can be spot-welded and/or MIG-welded to form an integral frame assembly for the rear end of a vehicle.

Hydroforming is a process by which a standard tubular stock member is placed into a form shaped to correspond to the particular member to be formed and to correspond to the particular section required for the frame design. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members. One skilled in the art will readily recognize that some MIG-welding will be required in areas where access holes are detrimental to the integrity of the frame structure. Preferably, such MIG-welding processes are performed at a sub-assembly or at a supplier level.

In the automotive rear end frame 10 depicted in the drawings, the bumper 15 is formed from welded hydroformed members. Similarly, the lower frame rails 20, which connect to the bumper 15 and project forwardly therefrom, are formed from tubular hydroformed members. The shock tower support member 25 is preferably a stamping that is formed into a specific shape and mounted on the lower frame rails 20, as is described in greater detail below.

The lower frame rail 20 is formed from two hydroformed tubular members 21, 22 that have corresponding first longitudinally extending portions 23 that are welded together at the rearwardmost end of the members 21, 22 preferably by MIG-welding along the generally horizontal seam between the members 21, 22. As is best seen in FIGS. 1 and 5, the lower frame rail structure 20 would then have an internal vertical web 24 formed from the adjacent sidewalls of the two tubular members 21, 22, oriented as an exterior member 21 and an interior member 22. The internal web 24 substantially increases the strength and stiffness of the lower frame rail 20, compared to a conventional tubular member.

The longitudinally extending portions 23 are positioned for connection to the bumper 15, as will be described in greater detail below. Forwardly of the longitudinally extending portions 23, the two tubular members 21, 22 diverge to define a divergent portion 28 to provide a lateral spacing between the two members 21, 22. At this point of divergence, the shock tower support 25 is affixed, preferably by welding, to the top of the two tubular members 21, 22. The tubular members 21, 22 converge into a second longitudinally extending portion 29 forward of said divergent portion 28.

Unlike conventional shock tower stampings, the shock tower support member 25 is adequately supported both inboard and outboard on the laterally spaced members 21, 22 to provide a stable foundation for the shock tower (not shown). The shock tower support stamping 25 transfers road loads directly to the frame 10 and also provides sectional stability for any rear impact loads that might be encountered. This design results in a stiffer, stronger, yet lighter joint than is known in the prior art.

To facilitate the use of spot welding techniques, the tubular members 21, 22 can be formed with appropriate access openings (not shown) in the sidewalks for passage of a welding electrode. Similarly, cross frame members 30 can be welded between the opposing sides of the lower frame rails 20 to span the lateral distance across the vehicle frame 10. The cross frame members 30 can be inserted into appropriate openings 27 in the sidewalls of the tubular members 21, 22 to permit the passage of the cross frame members 30 internally into the interior tubular member 22 to enable the cross frame members 30 to be welded directly to the interior tubular member 22.

Figure 6:
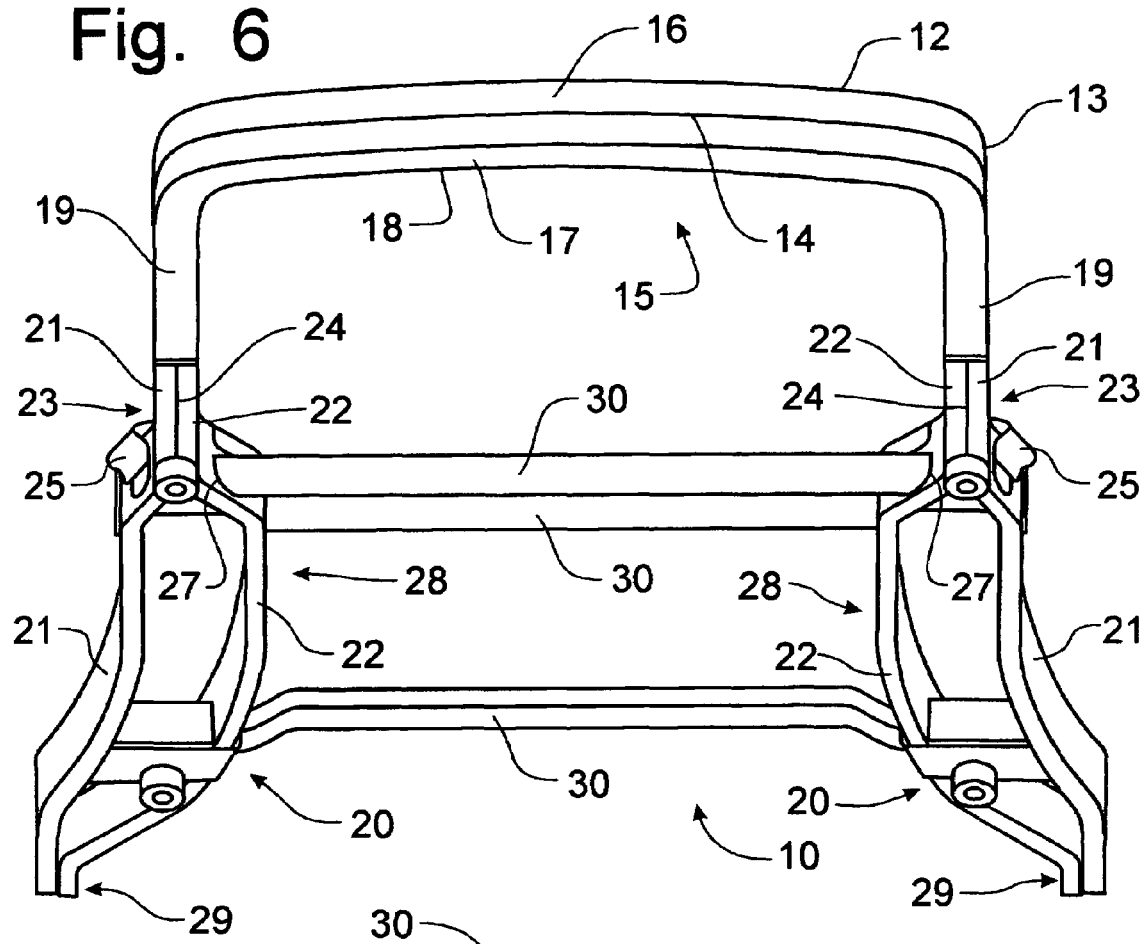
FIG. 6 is a bottom perspective view of the bumper and lower frame rail structure shown in FIG. 1.
Figure 7:
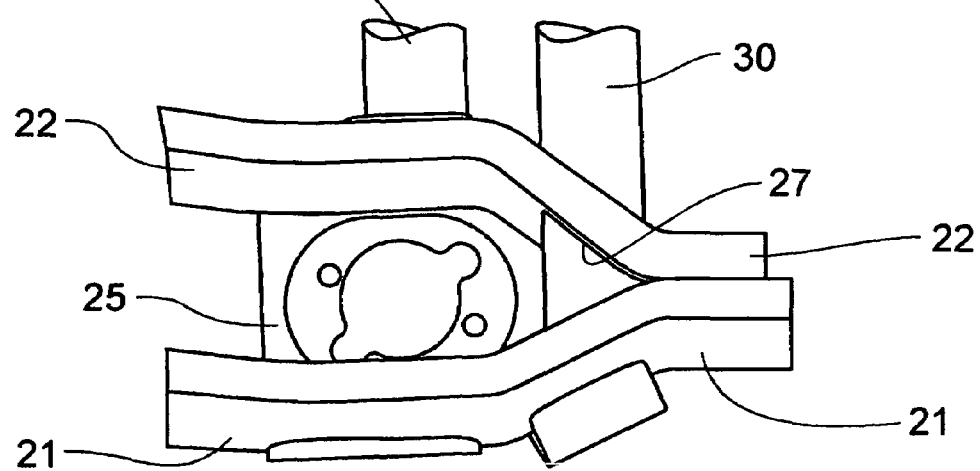
FIG. 7 is an enlarged bottom perspective view of the divergent zone of the lower frame rail assembly showing the connection of the cross frame members and the shock tower support member.

Preferably, as is best seen in FIG. 6, at least one of the cross frame members 30 adjacent the shock tower support 25 will pass through appropriate openings 27 in the interior tubular member 22 to engage the exterior tubular member 21 to permit welding between both members 21, 22 and the cross frame member 30. Such fabrication will add cross-vehicle stiffness to the frame 10, as well as provide a robust joint at the shock tower support 25. Preferably, the interior and exterior tubular members 21, 22 converge so that the lower frame rail 20 will extend forwardly with a central vertical web 24, as is shown with respect to the rearward longitudinally extending portions 23.

The bumper 15 can also be constructed from two hydroformed members 16, 17, with the upper tubular member 16 being located on top of the lower tubular member 17. Preferably both tubular bumper members 16, 17 are shaped substantially identically with a rearwardly positioned bight portion 18 and opposing mounting legs 19. The two tubular members 16, 17 can be MIG-welded along the generally horizontally extending seam therebetween to form a dual-celled bumper 15. Formation of the tubular members through the hydroforming process permits the introduction of deformation triggers 39, i.e. fold points to direct the deformation of the bumper in a prescribed manner when encountering an impact load.

This bumper 15 not only has the transversely oriented bight portion 18 forming the laterally extending rear bumper beam 12, but the integrally formed longitudinally extending mounting legs 19 provide the function of mounting the bumper beam 12 to the lower frame rails 20. A curved transition portion 13 preferably separates the transverse bight portion 18 from the longitudinal mounting legs 19. In conventional bumper design, the bumper beam, mounting rails, and attachment brackets are separate parts that are assembled to form the bumper structure. The formation of the bumper 15 according to the principles of the instant invention substantially reduces the number of parts required. With the two tubular members 16, 17 being welded together in a vertical orientation, the resultant structure has a horizontally oriented internal web 14 that enhances strength and stiffness for the bumper structure 15.

One of ordinary skill in the art will readily realize that the bumper 15 could also be formed through a roll-forming process in which the upper and lower cells of the bumper beam 15 would be separated by a horizontally oriented internal web 14. While the formation of the tubular members 16, 17 through the hydroforming process enables the tubular members 16, 17 to have triggers 39 formed therein during the formation process, the crash triggers 39 would have to be formed in the bumper by a separate processing step if the bumper 15 were manufactured through the roll-forming process.

Referring particularly to FIGS. 3-5, the forward ends of the mounting legs 19 are formed to mate with the dual tube lower frame rails 20. Each tubular member 16, 17 is formed with a reduced-sized terminal end 35 that can fit between the interior and exterior sidewalls of the lower frame rails 20, whereas the remainder of the mounting legs 19 are formed to correspond geometrically with the longitudinally extending portions 23 of the lower frame rails 20. As a result, the insertion of the reduced-sized terminal end 35 into the rearward ends of the lower frame rails 20 results in a generally uniformly shaped frame 10 with the overall width and depth of the bumper structure 15 being substantially equal to the overall width and depth of the lower frame rails 20.

To accommodate the interference between the horizontal internal web 14 of the mounting legs 19 and the vertical internal web 24 of the longitudinally extending portions 23 of the lower frame rails 20, the reduced-size terminal end 35 is formed with a slot 37 into the top and bottom walls of both of the upper and lower tubular members 16, 17. When the reduced-size ends 35 of the mounting legs 19 are inserted into the lower frame rails 20, the vertical internal web 24 slides into the aligned slots 37.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A lower frame rail for an automotive vehicle comprising: a pair of tubular members each of which has a height dimension and a width dimension, said tubular members being oriented to form a longitudinally extending portion with said tubular members being positioned laterally of one another, said tubular members diverging from said longitudinally extending portion to separate with a lateral distance therebetween, a shock tower support member being affixed to top surfaces of said laterally spaced tubular members such that said shock tower support member has an interior support on one of said tubular members and an exterior support on the other of said tubular members.

2. The lower frame rail of claim 1 wherein said tubular members are welded together along said longitudinally extending portion, adjacent sides of said tubular members forming a vertical web along said longitudinally extending portion.

3. The lower frame rail of claim 1 wherein the interior one of said tubular members has at least one cross frame member inserted into an interior sidewall of said interior tubular member, said at least one cross frame member being affixed to said interior tubular member.

4. The lower frame rail of claim 3 wherein a second cross frame member is inserted through openings formed in said interior sidewall and an exterior sidewall so that said second cross frame member can extend through said interior tubular member to engage an interior sidewall of the exterior tubular member, said second cross frame member being welded to both said interior and exterior tubular members.

5. The lower frame rail of claim 4 wherein said cross frame members are affixed to said interior tubular member where said interior tubular member is laterally spaced from said exterior tubular member.

6. The lower frame rail of claim 4 wherein said interior and exterior tubular members are formed through a hydroforming process.

7. A lower frame rail assembly for a rear-end portion of an automobile, said frame assembly supporting a shock tower assembly and a rear bumper, comprising:
an interior tubular member having a height dimension and a width dimension;
an exterior tubular member having height and width dimensions substantially equal to said interior tubular member;
said interior and exterior tubular members being welded together to form a first longitudinally extending portion with adjacent sidewalls of said tubular members defining a generally vertically oriented internal web;
said interior and exterior tubular members diverging from said first longitudinally extending portion to form a divergent portion such that a lateral distance spaces said interior tubular member from said exterior tubular member; and
a shock tower support member welded to said interior and exterior tubular members where said tubular members are divergent to provide separate interior and exterior support for said shock tower support member.

8. The lower frame rail assembly of claim 7 wherein said shock tower support member is a sheet metal stamping that is welded to top walls of said interior and exterior tubular members.

9. The lower frame rail assembly of claim 8 wherein a plurality of cross frame members is affixed to said interior tubular member along said divergent portion.

10. The lower frame rail assembly of claim 9 wherein at least one of said cross frame members pass through aligned openings in opposing side walls of said interior tubular member to engage said exterior tubular member.

11. The lower frame rail assembly of claim 10 wherein said aligned openings in said interior tubular member and an aligned opening in said exterior tubular member permit said at least one cross frame member to be inserted into said exterior tubular member.

12. The lower frame rail assembly of claim 11 wherein said interior and exterior tubular members converge to form a second longitudinally extending portion spaced from said first longitudinally extending portion.

13. The lower frame rail assembly of claim 12 wherein said first longitudinally extending portion is engageable with a rear bumper support for mounting said rear bumper rearwardly of said first longitudinally extending portion.

14. An automotive frame corresponding to a rearward portion of an automotive vehicle, comprising:
first and second laterally spaced lower frame rails, each said lower frame rail being formed from an interior tubular member and an exterior tubular member oriented laterally from one another, said tubular members forming:
a first longitudinally extending portion wherein said interior and exterior tubular members are welded together along a seam between said tubular members;
a divergent portion forwardly of said first longitudinally extending portion where said interior and exterior tubular members diverge to define a lateral distance therebetween; and
a second longitudinally extending portion forwardly of said divergent portion where said interior and exterior tubular portions are welded together; and a plurality of cross frame members interconnecting said first and second lower frame rails between the corresponding said divergent sections.

15. The automotive frame of claim 14 further comprising a shock tower support member welded to said interior and exterior tubular members at the respective said divergent portions.

16. The automotive frame of claim 15 wherein said longitudinally extending portions include a generally vertically oriented internal web formed from adjacent side walls of said interior and exterior tubular members.

17. The automotive frame of claim 16 wherein openings are formed in the side walls of said interior tubular member, said cross frame members being inserted into said openings to engage said interior tubular member.

18. The automotive frame of claim 17 wherein at least one of said cross frame members passes through aligned openings in the opposing side walls of said interior tubular member to engage an aligned opening in said exterior tubular member.

* * * * *

UNITED STATES PATENT AND TRADEMARK OFFICE
CERTIFICATE OF CORRECTION

PATENT NO. : 7,441,830 B2  
APPLICATION NO. : 11/147960  
DATED : October 28, 2008  
INVENTOR(S) : Ari Caliskan and Dean Gericke Page 1 of 1

It is certified that error appears in the above-identified patent and that said Letters Patent is hereby corrected as shown below:

On the Title Page, Item (73)

The names of the Assignees of this patent are:

Ford Global Technologies, LLC of Dearborn, MI

Vari-Form, Inc. of Warren, MI

Signed and Sealed this

Seventh Day of July, 2009

JOHN DOLL  
*Acting Director of the United States Patent and Trademark Office*